United States Patent Office 2,868,738
Patented Jan. 13, 1959

2,868,738

PREPARATION OF CATION-EXCHANGE RESINS BY OXIDATION OF VINYLALKOXY SULFIDE POLYMERS

Jesse C. H. Hwa, Levittown, Pa., assignor to Rohm & Haas Company, Philadelphia, Pa., a corporation of Delaware No Drawing. Application March 16, 1956
Serial No. 571,877

17 Claims. (Cl. 260—2.2)

This invention relates to cation-exchange resins and their preparation. It relates to a method of preparing cation-exchange resins which contain strongly acidic sulfonic acid groups and may also contain weakly acidic carboxyl groups. It is also concerned with new cation-exchange resins which contain both strongly acidic sulfonic acid groups and weakly acidic carboxyl groups. This application is a continuation-in-part of my copending application Serial No. 485,315, filed January 31, 1955, now abandoned.

Olefinic sulfonic acids and their salts, such as ethylene sulfonic acid, do not polymerize well with such cross-linking agents as divinylbenzene and it is practically impossible, because of the water-solubility of ethylene sulfonic acid, to carry out the copolymerization by the suspension technique to obtain directly a granular copolymer suitable for ion-exchange uses. It is also practically impossible, as far as now known, to produce water-insoluble polymers containing olefinic sulfonic acid groups by copolymerizing a mono-olefin, such as ethylene, with a cross-linking agent, such as divinylbenzene and subsequently sulfonating the copolymer.

In accordance with the present invention, a new and improved method is provided for producing cation-exchange resins of the sulfonic type and of the carboxy-sulfonic type. The present invention also provides new cation-exchange resins of the carboxy-sulfonic type.

In one aspect of this invention, insoluble polymers of certain organic sulfides are chemically converted to sulfonic acid resins having cation-exchange properties. In another aspect, copolymers of the same organic sulfides and lower alkyl esters of acrylic or methacrylic acids are converted to copolymers containing both sulfonic acid groups and carboxyl groups as their polar, cation-exchanging groups.

The products of this invention are insoluble in aqueous solutions of acids, bases and salts; and they are capable of adsorbing cations by virtue of containing recurring units having the Formula I:

I 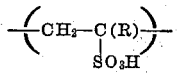

In addition to the sulfonic acid units, they may also contain recurring units of the Formula II:

II 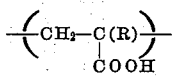

in which case the products are carboxy-sulfonic cation-exchange resins. In both instances R represents a hydrogen atom or a methyl group.

The instant products are made by treating insoluble copolymers of certain organic sulfides with aqueous solutions of oxidizing agents. As described in another of my applications for Letters Patent, Serial No. 485,622, filed February 1, 1955, now abandoned, the organic sulfides, which are first polymerized or copolymerized and are then reacted with aqueous solutions of oxidizing agents to form the ion-exchangers of the instant invention, have the general Formula III:

III 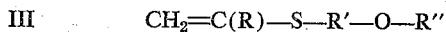

In the formula, R represents a hydrogen atom or a methyl group, R' is a methylene, ethylidene, or isopropylidene group, and R" is an alkyl group. The polymers of the sulfides contain recurring units of the structure of Formula IV:

IV 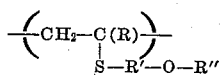

Due to the action of the aqueous solutions of oxidizing agents, the portion, —S—R'—O—R", of these recurring groups is converted to the —SO$_3$H configuration. Since, in reality, the —R'—O—R" portion forms no part of the final ion-exchange resin, it is much preferred that the compounds which contain the smallest and hence cheapest methoxymethyl group, —CH$_2$—O—CH$_3$, be employed as starting materials.

In order to obtain an insoluble polymeric organic sulfide for reaction with the aqueous oxidizing agents, the monomeric sulfide is copolymerized with a copolymerizable compound which contains two or more non-conjugated points of ethylenic unsaturation or two or more non-conjugated vinylidene groups of the structure, CH$_2$=C=. Such comonomers serve as cross-linking agents. At present, divinylbenzene is much the preferred cross-linking agent; but others which can be used include divinyltoluene, trivinylbenzene, divinylnaphthalene, diallyl phthalate, ethylene glycol diacrylate or dimethacrylate, divinylxylene, divinylethylbenzene, divinyl ether, divinyl sulfone, allyl ethers of polyhydric compounds such as of glycerol, pentaerythritol, resorcinol, etc., divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicone, diallyl silicate, triallyl tricarballylate, triallyl aconitate, triallyl citrate, triallyl phosphate, N,N'-methylenediacrylamide, N,N' - methylenedimethacryl - amide, N,N' - ethylidenediacrylamide, 1,2 - di(α - methyl-methylenesulfonamido)-ethylene, and so on.

As little as 0.5% of the cross-linking agent, on a molar basis, has a cross-linking effect as evidenced by decreased solubility. And as much as 50%, on the same basis, has been used. It is, however, preferred to employ from about 1% to about 20% of the polyvinyl cross-linker, on a molar basis.

The mixtures of the monomeric organic sulfide and the monomeric polyvinyl cross-linking agent can be polymerized in bulk, in solution, in aqueous suspension or in aqueous emulsion. For purposes of this invention, it is much preferred that the mixtures be polymerized in aqueous suspension because this leads to the formation of the insoluble copolymers in the shape of small beads or spheroids. Such resinous particles retain their shape throughout the reaction with aqueous oxidizing agents; and the resultant ion-exchange resins are in an ideal form for use in ion-exchange processes.

In the preparation of the carboxy-sulfonic resins of this invention, a monomeric, copolymerizable ester of acrylic acid or methacrylic acid is included in the mixture of monomeric organic sulfide and monomeric polyvinyl cross-linking agent to be polymerized. Any amount of the unsaturated ester can be mixed and copolymerized, depending on the ratio of ion-exchanging sulfonic acid groups and carboxyl groups which is desired in the final cation-exchange resin. For most purposes, the proportions of these monoethylenically unsaturated monomers in the copolymers may range from 5 to 95 mole percent of the organic sulfide monomer of Formula III and between 95 and 5 mole percent of the ester. If desired, for certain purposes, the sulfide of Formula III may be as low as 1 mole percent or, on the other hand, it may constitute 99 mole percent, the remainder of monoethylenically unsaturated comonomer being one of the aforesaid esters, especially methyl acrylate when it is desired to produce free carboxyl groups by hydrolysis of the ester. Ordinarily, however, the amount of ester to be copolymerized is equal to the amount of the organic sulfide, on a molar basis, or less. Since in a subsequent reaction the ester portions of the copolymers are hydrolyzed to carboxyl groups, it is more economical, and hence preferred, to employ the lower alkyl esters of the acrylic or methacrylic acids, particularly the methyl or ethyl esters.

The copolymerization of all of the monomeric mixtures is carried out at any convenient temperature. But, since heat and catalysts accelerate such polymerizations, it is preferred to carry out this step at temperatures above 50° C. in the presence of a catalyst of the free radical type. When copolymerization is carried out in aqueous suspension, temperatures above 50° C. and up to the boiling point of the reaction mixture can be employed. Temperatures from about 60° C. to about 90° C. are, however, recommended.

Suitable catalysts for the copolymerization are those customarily used to accelerate polymerizations of the vinyl or addition type. Typical of such catalysts are the following: $\alpha,\alpha'$-bis-azoisobutyronitrile, dimethyl azobisisobutyrate, 2,2'-azobis-2,4-dimethylvaleronitrile, benzoyl peroxide, acetyl peroxide, lauroyl peroxide, tert-butyl hydroperoxide, di-tert-butyl peroxide, tert-butyl perbenzoate, stearoyl peroxide, cumene hydroperoxide, and "persalts" such as ammonium persulfate and ammonium perborate. The catalysts are used in amounts from 0.2% to 5%, and preferably from 0.5% to 2%, based on the weight of the copolymerizable compounds.

In the reaction with the aqueous oxidizing agents the insoluble copolymers of the organic sulfides are used in the form of particles. Such particles may be the spheroidal particles resulting from suspension polymerization, as mentioned above, or they may be the particles obtained by grinding or otherwise comminuting a copolymer formed by bulk polymerization, for example.

The particles of the insoluble copolymers of the organic sulfides are converted to the ion-exchanging products containing sulfonic groups by reaction with an aqueous solution of an oxidizing agent. Aqueous solutions of the following oxidizing agents have been used: hydrogen peroxide, chlorine, sodium hypochlorite, calcium hypochlorite, nitric acid, potassium permanganate, peracetic acid, performic acid and potassium dichromate. Of these, hydrogen peroxide is much preferred because of the ease and efficiency of reaction, particularly when the pH of the solution is below 7. Temperatures from room temperature up to the boiling point of the aqueous solution can be used depending on the speed of reaction which is required. In commercial practice, temperatures from about 40° C. to about 60° C. are employed because at such temperatures the reaction is easily controlled. Agitation, of course, is recommended.

In those cases where the copolymer contains ester groups and it is desired to produce a resin containing both sulfonic acid and carboxyl groups, the sulfide groups may be oxidized to the sulfonic acid groups either before or after the hydrolysis of the ester groups to carboxyl groups. However, it is much preferred to first hydrolyze the ester groups to carboxylate by means of an alkaline solution. Suitable hydrolyzing media include aqueous or alcoholic solutions of alkali metal hydroxides, particularly sodium hydroxide or potassium hydroxides. Solutions of conventional organic quaternary ammonium hydroxides, e. g. trimethylbenzylammonium hydroxide, can also be used. What is required is that the hydrolyzing solution be alkaline. The hydrolysis may be effected at room temperature up to the reflux temperature of the medium, which may be aqueous or aqueous alcoholic. The proportion of alkaline material used may be less than an amount equivalent to the ester groups if partial hydrolysis is desired or it may be used in approximately molar equivalent amounts or in excess thereof if complete hydrolysis is desired. The concentration of the alkaline material may be from 1% to 50%, and the preferred concentration is generally from 5% to 20% especially in the case of caustic soda. After the hydrolysis step, if the sulfide groups have not already been oxidized to sulfonic acid groups, the copolymer is reacted with an aqueous solution of an oxidizing agent—preferably with an acidic solution of hydrogen peroxide. In this way, a resin containing both carboxyl and sulfonic acid groups is readily prepared.

The products of this invention are in reality insoluble polyethylene sulfonic acids (when R is a hydrogen atom) or polyisopropylene sulfonic acids (when R is a methyl group) cross-linked by a copolymerized compound—preferably divinylbenzene—which, in the monomeric form, contains two or more groups of the structure $CH_2=C$. The products of this invention also include carboxy-sulfonic cation-exchangers which are insoluble copolymers of either (a) ethylene sulfonic acid or isopropylene sulfonic acid and (b) acrylic acid or methacrylic acid, the copolymers being cross-linked by a copolymerized compound which, in the monomeric form, contains two or more groups of the structure, $CH_2=C=$.

These products are capable of exchanging cations and hence are useful in deionization processes and in the softening of water. Thus, the sulfonic acid groups and the carboxyl groups exchange their hydrogen ions for the ions of metals such as sodium, potassium, calcium, magnesium, iron, cobalt, lead, et cetera. After the resins have adsorbed their full capacity of metallic ions, they are regenerated to the acid form by treatment with a strong acid such as hydrochloric acid or sulfuric acid.

The following examples serve to illustrate further the preparation and properties of the resins of this invention:

*Example 1*

(a) A mixture of 17.2 grams of vinyl methoxymethyl sulfide, $CH_2=CH-S-CH_2OCH_3$, 2.84 grams of divinylbenzene (technical grade) and 0.4 gram of dimethyl azobisisobutyrate was suspended in an aqueous phase containing 27.5 grams of water, 11.4 grams of sodium chloride, and 1.8 grams of a 3% aqueous dispersion of magnesium silicate. The mixture, in a three-necked flask equipped with stirrer, thermometer, reflux condenser and gas-inlet tube, was stirred and heated to 80° C. under a blanket of nitrogen. Stirring and heating at 80° to 85° C. was continued for 22 hours, after which the beads of resin were filtered off and were washed with ethanol. The beads were next extracted with ethylene dichloride and were finally dried.

(b) The insoluble, cross-linked, resinous beads were then reacted with a 5% aqueous solution of hydrogen peroxide which also contained 4% sulfuric acid. The reaction was carried out at 40° to 45° C. for five hours, after which the particles were removed by filtration and were thoroughly washed with water. The product, still in the form of discrete spheroidal particles, had a cation-exchange capacity of five to six milliequivalents per gram (dry basis).

(c) The procedure of parts (a) and (b) produce a similar cation-exchange resin when the divinylbenzene is replaced in separate successive runs with each of the following polyethylenically unsaturated cross-linking agents:

(1) 3 grams of divinyltoluene
(2) 3.3 grams of ethylene glycol diacrylate
(3) 2.9 grams of N,N'-methylenedimethacrylamide

Example II (a) In a similar manner a cross-linked copolymer of 83% vinyl methoxymethyl sulfide and 17% divinylbenzene (technical grade, containing approximately 50% divinylbenzene), in the form of spheroids, was heated at 45° to 50° C. for six hours in a 10% aqueous solution of hydrogen peroxide which also contained 20% acetic acid. The cation-exchange resin which was separated and thoroughly washed had a cation-exchange capacity of over six milliequivalents per gram (dry basis) and in the moistened condition weighed 41 lbs./cu. ft.

(b) Likewise a resin prepared by reacting a copolymer of 76% vinyl methoxymethyl sulfide and 24% divinylbenzene (technical grade) with an aqueous solution containing 10% hydrogen peroxide and 4% sulfuric acid for six hours at 54° to 57° C., had a capacity of between five and six milliequivalents per gram (dry basis).

(c) Also a resin prepared by reacting a copolymer of 76% vinyl 2-ethylhexoxymethyl sulfide and 24% divinylbenzene with an aqueous solution of 10% hydrogen peroxide and 4% sulfuric acid for eight hours at 50° to 55° C., was found to be, for all intents and purposes, identical with the resin described in part (b) hereof.

Example III (a) An insoluble, cross-linked terpolymer was prepared in spheroidal form by the method described above from a mixture containing 27% vinyl methoxymethyl sulfide, 65% ethyl acrylate and 8% technical divinylbenzene. This product was next reacted for 20 hours with ten times its volume of a 15% alcoholic solution of sodium hydroxide at refluxing temperature. The ethyl ester groups were thereby converted to sodium carboxylate groups. The resin was next washed with water and was then converted to the hydrogen or acid form by treatment with an excess over the calculated amount of a 4% aqueous solution of sulfuric acid. After being washed thoroughly, the resin was tested for cation-exchange capacity with a dilute solution of calcium chloride. It was found to have a capacity of 6.38 milliequivalents per gram on a dry basis. Its salt-splitting capacity, i. e. its ability to remove sodium ions from a solution of sodium chloride, was, however, negligible.

(b) The resin of part (a) hereof, after regeneration to the hydrogen form by means of a 4% solution of hydrochloric acid, was heated at 50° to 55° C. for four hours in an aqueous solution containing 20% hydrogen peroxide and 2% sulfuric acid. The final product had a total cation-exchange capacity of 8.09 milliequivalents per gram (dry basis) including a salt-splitting capacity of 1.7 milliequivalents per gram (dry).

(c) A cation-exchange resin containing about 20% by weight of isopropylene sulfonic acid units of the formula

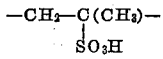

70% of methyl acrylate and 10% of divinylbenzene, obtained by the suspension copolymerization of a mixture of $CH_2=C(CH_3)-SCH_2OCH_3$, methyl acrylate, and divinylbenzene and subsequent oxidation as in part (b) hereof may have its exchange capacity increased to various extents by controlled hydrolysis of the acrylate groups by the procedure of part (a) hereof, adjusting the amount of sodium hydroxide to produce hydrolysis of 50% of the ester groups, in one case, and about 100% in another.

Ion-exchange resins like that of Example I(b) above were made by reacting copolymers of vinyl methoxymethyl sulfide and divinylbenzene with 15% aqueous solutions of other oxidizing agents including nitric acid, potassium permanganate and potassium dichromate; but it must be pointed out that none of these reacted as rapidly or to the same extent in a given time as did hydrogen peroxide. For this reason, the use of acidic aqueous solutions of hydrogen peroxide is much preferred.

I claim:

1. A composition of matter comprising a copolymer of 0.5 to 50 mole percent of a polyethylenically unsaturated compound in which the points of unsaturation are in non-conjugated relationship with 50 to 99.5 mole percent of monoethylenically unsaturated molecules comprising at least one mole percent of an organic sulfide having the formula $$CH_2=C(R)-S-R'-O-R''$$

in which R is a member of the class consisting of a hydrogen atom and a methyl group, R' is a member of the class consisting of methylene, ethylidene and isopropylidene groups, and R'' is an alkyl group and at least one mole percent of a compound selected from the group consisting of esters of a monohydric alcohol with an acid selected from the group consisting of acrylic and methacrylic acids.

2. The composition of claim 1 in which the polyethylenically unsaturated compound is divinylbenzene, the organic sulfide is vinyl methoxymethyl sulfide, and the compound selected from the group consisting of stated esters is methyl acrylate.

3. The composition of claim 1 in which the polyethylenically unsaturated compound is divinylbenzene, the organic sulfide is vinyl methoxymethyl sulfide, and the compound selected from the group consisting of stated esters is ethyl acrylate.

4. The composition of claim 1 in which the polyethylenically unsaturated compound is divinylbenzene, the organic sulfide is vinyl methoxymethyl sulfide, and the compound selected from the group consisting of stated esters is methyl methacrylate.

5. The composition of claim 1 in which the polyethylenically unsaturated compound is divinylbenzene, the organic sulfide is vinyl methoxymethyl sulfide, and the compound selected from the group consisting of stated esters is ethyl methacrylate.

6. The composition of claim 1 in which the polyethylenically unsaturated compound is divinylbenzene, the organic sulfide is a compound of the formula $$CH_2=C(CH_3)SCH_2OCH$$

and the compound selected from the group consisting of stated esters is methyl acrylate.

7. A process for preparing cation-exchange resins which comprises reacting an aqueous solution of an agent for oxidizing sulfur to sulfonic acid from the group consisting of hydrogen peroxide, chlorine, sodium hypochlorite, calcium hypochlorite, nitric acid, potassium permanganate, peracetic acid, performic acid and potassium dichromate with an insoluble copolymer of (a) 50 to 99.5 mole percent of monoethylenically unsaturated molecules comprising at least one mole percent of an organic sulfide having the formula $$CH_2=C(R)-S-R'-O-R''$$

in which R is a member of the class consisting of a hydrogen atom and a methyl group, R' is a member of the class consisting of methylene, ethylidene and isopropylidene groups, and R'' is an alkyl group; and (b) 0.5 to 50 mole percent of a polyethylenically unsaturated copolymerizable compound in which the points of unsaturation are in non-conjugated relationship.

8. The process of claim 7 in which said aqueous solution is an aqueous solution of hydrogen peroxide.

9. A process for preparing cation-exchange resins which comprises reacting an aqueous solution of an agent for oxidizing sulfur to sulfonic acid from the group consisting of hydrogen peroxide, chlorine, sodium hypochlorite, calcium hypochlorite, nitric acid, potassium permanganate, peracetic acid, performic acid and potassium dichromate with an insoluble copolymer of (a) 50 to 99.5 mole percent of monoethylenically unsaturated molecules comprising at least one mole percent of vinyl methoxymethyl sulfide and (b) 0.5 to 50 mole percent of a polyethylenically unsaturated copolymerizable compound in which the points of unsaturation are in non-conjugated relationship.

10. A process for preparing cation-exchange resins which comprises reacting an aqueous solution of an agent for oxidizing sulfur to sulfonic acid from the group consisting of hydrogen peroxide, chlorine, sodium hypochlorite, calcium hypochlorite, nitric acid, potassium permanganate, peracetic acid, performic acid and potassium dichromate, with an insoluble copolymer of (a) 50 to 99.5 mole percent of monoethylenically unsaturated molecules comprising at least one mole percent of vinyl methoxymethyl sulfide and (b) 0.5 to 50 mole percent of divinylbenzene.

11. A process for preparing cation-exchange resins which comprises reacting an aqueous solution of hydrogen peroxide with an insoluble copolymer of (a) 50 to 99.5 mole percent of monoethylenically unsaturated molecules comprising at least one mole percent of vinyl methoxymethyl sulfide and (b) 0.5 to 50 mole percent of divinylbenzene.

12. A process for preparing cation-exchange resins which comprises subjecting an insoluble copolymer of (a) 50 to 99.5 mole percent of monoethylenically unsaturated molecules comprising at least one mole percent of an organic sulfide having the formula

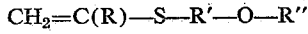
$$CH_2=C(R)-S-R'-O-R''$$

in which R is a member of the class consisting of a hydrogen atom and a methyl group, R' is a member of the class consisting of methylene, ethylidene and isopropylidene groups, and R'' is an alkyl group, and (b) 0.5 to 50 mole percent of a polyethylenically unsaturated copolymerizable compound in which the points of unsaturation are in non-conjugated relationship, and (c) at least one mole percent of a lower alkyl ester of an acid from the class consisting of acrylic and methacrylic acids to the steps, in either order, of (1) hydrolyzing copolymerized ester groups to carboxylic groups with an aqueous alkaline solution and (2) converting the alkoxymethyl sulfide groups to sulfonic groups with an aqueous solution of an agent for oxidizing sulfur from the group consisting of hydrogen peroxide, chlorine, sodium hypochlorite, calcium hypochlorite, nitric acid, potassium permanganate, peracetic acid, performic acid and potassium dichromate.

13. A process for preparing cation-exchange resins which comprises first reacting an insoluble copolymer with a solution of an alkali metal hydroxide and thereafter reacting the resultant product with an aqueous solution of hydrogen peroxide, said copolymer being a copolymer of (a) 50 to 99.5 mole percent of monoethylenically unsaturated molecules comprising at least one mole percent of vinyl methoxymethyl sulfide, (b) 0.5 to 50 mole percent of divinylbenzene and (c) methyl acrylate.

14. A process for preparing cation-exchange resins which comprises first reacting an insoluble copolymer with a solution of an alkali metal hydroxide and thereafter reacting the resultant product with an aqueous solution of hydrogen peroxide, said copolymer being a copolymer of (a) 50 to 99.5 mole percent of monoethylenically unsaturated molecules comprising at least one mole percent of vinyl methoxymethyl sulfide, (b) 0.5 to 50 mole percent of divinylbenzene and (c) ethyl acrylate.

15. A process for preparing cation-exchange resins which comprises first reacting an insoluble copolymer with a solution of an alkali metal hydroxide and thereafter reacting the resultant product with an aqueous solution of hydrogen peroxide, said copolymer being a copolymer of (a) 50 to 99.5 mole percent of monoethylenically unsaturated molecules comprising at least one mole percent of vinyl methoxymethyl sulfide, (b) 0.5 to 50 mole percent of divinylbenzene and (c) methyl methacrylate.

16. A process for preparing cation-exchange resins which comprises first reacting an insoluble copolymer with a solution of an alkali metal hydroxide and thereafter reacting the resultant product with an aqueous solution of hydrogen peroxide, said copolymer being a copolymer of (a) 50 to 99.5 mole percent of monoethylenically unsaturated molecules comprising at least one mole percent of vinyl methoxymethyl sulfide, (b) 0.5 to 50 mole percent of divinylbenzene and (c) ethyl methacrylate.

17. A process for preparing cation-exchange resins which comprises first reacting an insoluble copolymer with a solution of an alkali metal hydroxide and thereafter reacting the resultant product with an aqueous solution of hydrogen peroxide, said copolymer being a copolymer of (a) 50 to 99.5 mole percent of a compound of the formula $CH_2=C(CH_3)SCH_2OCH_3$, (b) 0.5 to 50 mole percent of divinylbenzene and (c) at least one mole percent of methyl acrylate.

References Cited in the file of this patent
UNITED STATES PATENTS

| | | |
|---|---|---|
| 2,527,300 | Dudley | Oct. 24, 1950 |
| 2,664,414 | Morris | Dec. 29, 1953 |
| 2,678,307 | Ferris et al. | May 11, 1954 |
| 2,783,212 | Schnell | Feb. 26, 1957 |

OTHER REFERENCES

Whitmore: "Organic Chemistry" (1937), pages 160 and 161, Van Nostranel.